United States Patent Office 3,538,092
Patented Nov. 3, 1970

3,538,092
DERIVATIVES OF N,N',N''-TRIS(3-MERCAPTO-PROPIONYL)-HEXAHYDRO-s-TRIAZINE
Martin Dexter, Briarcliff Manor, N.Y., assignor to Geigy Chemical Corporation, Greenburgh, N.Y., a corporation of New York
No Drawing. Filed Dec. 11, 1968, Ser. No. 783,103
Int. Cl. C07d 55/14
U.S. Cl. 260—248       6 Claims

ABSTRACT OF THE DISCLOSURE

The N,N',N''-tris(3 - mercaptopropionyl)-hexahydro-s-triazine derivatives of this invention are useful as stabilizers of organic materials subject to oxidative deterioration. These compounds may be prepared by reacting triacryloyl hexahydro-s-triazine with an alkyl mercaptan in the presence of a basic catalyst.

DETAILED DESCRIPTION

This invention relates to the derivatives of N,N',N''-tris(3 - mercaptopropionyl)-hexahydro-s-triazine and to compositions otherwise subject to oxidative deterioration stabilized by the incorporation therein of such triazine compounds.

In particular the present invention pertains to compounds of the formula:

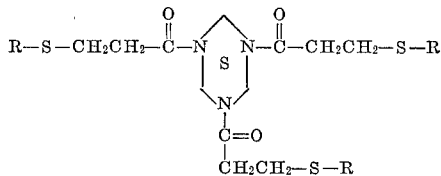

wherein R is $-C_nH_{2n+1}$ $-C_2H_4-S-C_nH_{2n+1}$

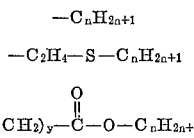

where $n$ is an integer from 1 to 18 and $y$ is 1 or 2.

By the group $-C_nH_{2n+1}$ is meant alkyl group containing straight or branched chain hydrocarbons having from 1 to 18 carbon atoms. Illustrative examples of such alkyl groups are methyl, ethyl, propyl, isopropyl, butyl, t-butyl, octyl, decyl, dodecyl, tetradecyl, octadecyl, and the like. In a preferred embodiment the alkyl group has 8 to 18 carbon atoms.

The N,N',N''-tris(3 - mercaptopropionyl)-hexahydro-s-triazine derivatives of this invention may be prepared by a two-step reaction. The first step comprises reacting acrylonitrile, acetic anhydride and paraformaldehyde in the presence of sulfuric acid. The resulting compound is triacryloyl-hexahydro-s-triazine which is used as an intermediate for the preparation of the final product. The preparation of said intermediate is described in greater detail in Wegler et al., Berichte, 81, 527 (1948).

The second step comprises reacting triacryloyl-hexahydro-s-triazine with an alkyl mercaptan to produce the corresponding derivative of N,N',N''-tris(3 - mercaptopropionyl)-hexahydro-s-triazine. This reaction is carried out either in an organic solvent or without a solvent, but in the presence of a basic catalyst.

If a solvent is desired, any organic solvent which does not interfere with the reaction and in which the reactants are at least partially soluble may be employed. Illustrative examples of solvents useful in this reaction are aliphatic alcohols such as methanol, ethanol, propanol, isopropanol, butanol and the like; ethers, such as diethyl ether, di-n-propyl ether, tetrahydrofuran, dioxane and the like. Additional useful solvents are dimethylformamide, dimethylacetomide, dimethylsulfoxide and the like.

The basic catalysts useful in the second step of the reaction are alkali metal, alkali metal hydroxides, carbonates and alcoholates as well as organic amines, alkanolamines, organic quaternary ammonium hydroxides and quaternary ammonium alkoxides. Illustrative examples of said catalysts are sodium hydroxide, potassium hydroxide, lithium hydroxide, sodium and potassium, sodium methoxide, sodium ethoxide, sodium isopropoxide, potassium methoxide, potassium ethoxide, ethylamine, dimethylamine, propylamine, n-butylamine, triethylene diamine, trimethylammonium hydroxide, triethylammonium hydroxide, triisopropylammonium hydroxide, tri-n-butylammonium hydroxide and the like. Only a small amount of the catalyst is needed to carry out the reaction economically. Generally the catalyst is employed in the amount of from about 0.001 to 10 percent by weight based on the triacryloyl hexahydro-s-triazine. A more preferred range is from 0.005 to about 1 percent by weight.

The method for preparing the derivatives of N,N',N''-tris(3 - mercaptopropionyl)-hexahydro-s-triazine is more specifically described in Example 1 below.

In preparing the compounds of this invention where R group is ethylenethioalkyl, i.e., $-C_2H_4-S-C_nH_{2n+1}$, the procedure described above and in Example 1 generally followed except that the alkylmercaptan is replaced with alkylthioethylmercaptan, i.e., $$HS-CH_2CH_2-S-C_nH_{2n+1}$$

Illustrative examples of alkylthioethylmercaptans are methylthioethylmercaptan, isopropylthioethylmercaptan, n-hexylthioethylmercaptan, n-octylthioethylmercaptan, n-dodecylthioethylmercaptan, n-octadecylthioethylmercaptan, and the like.

In preparing the compounds of this invention where the R group is carbalkoxymethyl or carbalkoxyethyl, i.e.,

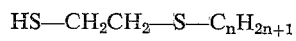

the procedure described above and in Example I is generally followed except that the alkylmercaptan is replaced by an alkyl 3-mercaptopropionate, i.e.,

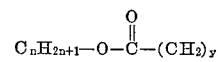

or an alkyl mercaptoacetate, i.e.,

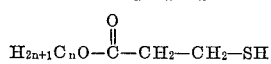

Illustrative examples are methyl 3-mercaptopropionate, n-octyl 3-mercaptopropionate, n-octadecyl 3-mercaptopropionate and the like and ethylmercaptoacetate, n-octylmercaptoacetate, n-dodecylmercaptoacetate, n-octadecylmercaptoacetate and the like.

The products obtained after base-catalyzed addition of the alkyl 3-mercaptopropionates with triacryloyl-hexahydro-s-triazine are for example, N,N',N''-tris[3-(carbalkoxyethylthio)propionyl] - hexahydro-s-triazines. The same reaction with alkyl mercaptoacetate would yield N,N',N''-tris[3 - (carbalkoxymethylthio)propionyl]-hexahydro-s-triazine.

The derivatives of N,N',N''-tris(β-mercaptopropionyl)-hexahydro-s-triazine of the present invention are stabilizers of organic material normally subject to oxidative deterioration. Materials which are thus stabilized according to the present invention include synthetic organic polymeric substances such as vinyl resin formed from the polymerization of vinyl halides or from the copolymerization of vinyl halides with unsaturated polymerizable compounds, e.g., vinyl esters, α,β-unsaturated aldehydes and unsaturated hydrocarbons such as butadienes and styrene; poly-α-olefins such as polyethylene, polypropylene, polybutylene, polyisoprene and the like, including copolymers of poly-α-olefins, polyurethanes such as are prepared from polyols and organic polyisocyanates; polyamides such as polyhexamethylene adipamide and polycaprolactam, polyesters such as polymethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials stabilized according to the present invention include lubrication oil of the aliphatic ester type, e.g. di(2-ethylhexyl)-azelate, pentaerythritol tetracaproate and the like; animal and vegetable derived oils, e.g., linseed oil, fat, tallow, lard, peanut oil, cod liver oil, castor oil, palm oil, corn oil, cotton seed oil, and the like; hydrocarbon material such as gasoline, mineral oil, fuel oil, drying oil, cutting fluids, waxes, resins, and the like, fatty acids such as soaps and the like.

In general the stabilizers of this invention are employed from about 0.005% to about 10% by weight of the stabilized composition. A particularly advantageous range for polyolefins, such as polypropylene is from about 0.1% to about 1%.

Although the compounds of this invention are useful as stabilizers per se, their greatest importance resides in the ability to vastly improve the effectiveness of numerous other compounds especially phenolic compounds, which are used as stabilizers for organic materials normally subject to deterioration. Thus, the compounds of this invention may be classified as "synergists" since when they are combined with stabilizers they exhibit the ability to increase the total stabilization to a degree far exceeding that which could be expected from the additive properties of the individual components. The stabilizers with which the compounds of this invention may be combined are, generally, phenolic triazines, phenolic phosphonates, phenolic esters and phenolic hydrocarbons.

Typical of the phenolic antioxidants whose stabilizing properties are improved by the addition of the compounds of the present invention, are the following:

CLASS A.—PHENOLIC TRIAZINE STABILIZERS 6-(4-hydroxy-3-methyl-5-t-butylanilino-2,4-bis(n-octylthio)-1,3,5-triazine
6-(hydroxy-3,5-dimethylanilino)-2,4-bis(n-octylthio)-1,3,5-triazine
6-(4-hydroxy-3,5-di-t-butylanilino)-2,4-bis-(phenoxy)-ethylthio)-1,3,5-triazine
2,4-bis-(4-hydroxy-3,5-di-t-butylphenoxy)-6-(n-octylthio)-1,3,5-triazine
6-(4-hydroxy-3,5-di-t-butylanilino)-2,4-bis-(phenoxy)-1,3,5-triazine
6-(4-hydroxy-3,5-di-t-butylanilino)-4-(4-hydroxy-3,5-di-t-butylphenoxy)-2-(n-octylthio)-1,3,5-triazine
6-(4-hydroxy-3-t-butylphenoxy)-2,4-bis-(n-octylthioethylthio)-1,3,5-triazine
2,4,6-tris-(4-hydroxy-3-methyl-5-t-butylphenoxy)-1,3,5-triazine
2,4-bis-(4-hydroxy-3,5-di-t-butylphenoxy)-6-amino-1,3,5-triazine
2,4-bis-(4-hydroxy-3,5-di-t-butylphenoxy)-6-dodecylamino-1,3,5-triazine
6-(4-hydroxy-3,5-di-t-butylphenoxy)-2,4-bis-(n-octylthiopropylthio)-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine The above phenolic triazine stabilizers are more fully described in U.S. Pat. No. 3,255,191.

CLASS B.—PHENOLIC PHOSPHONATE STABILIZERS

Among the many phosphonate stabilizers whose properties are improved by the addition of compound of the present invention are the di-(lower)alkyl phosphonates disclosed in U.S. Pat. No. 3,006,945. Particularly valuable phenolic phosphonates in this regard however are the di-(higher)alkyl phenolic phosphonates, i.e., having from 14 to 30 carbon atoms in each alkyl group. Representative of these are the following:

Di-n-octadecyl 3-t-butyl-4-hydroxy-5-methyl-benzylphosphonate
Di-n-octadecyl 1-(3,5-di-t-butyl-4-hydroxy-phenyl)-ethanephosphonate
Didodecyl-3,5-di-t-butyl-4-hydroxybenzyl-phosphonate
Di-n-octadecyl 3,5-di-t-butyl-4-hydroxybenzyl-phosphonate The above di-(higher)alkyl phenolic phosphonates are more fully described in the application of John Spivack, Ser. No. 308,345, filed Sept. 12, 1963, now abandoned.

CLASS C.—PHENOLIC ESTER STABILIZERS

Subclass C-1 n-Octadecyl 3,5-di-t-butyl-4-hydroxyphenylacetate
n-Octadecyl 3,5-di-t-butyl-4-hydroxybenzoate
Neo-dodecyl 3-(3,5-di-t-butyl-4-hydroxyphenyl)-propionate
Dodecyl β-(3,5-di-t-butyl-4-hydroxyphenyl)-pripionate
Ethyl α-(4-hydroxy-3,5-di-t-butylphenyl)isobutyrate

Subclass C-2

2-(n-octylthio)-ethyl 3,5-di-t-butyl-4-hydroxybenzoate
2-(n-octadecylthio)ethyl 3,5-di-t-butyl-4-hydroxyphenylacetate
2-(2-hydroxyethylthio)ethyl 3,5-di-t-butyl-4-hydroxybenzoate
β,β'-Thiodiethyl bis(3,5-di-t-butyl-4-hydroxyphenyl-acetate
Diethylene glycol bis-[3-(3,5-di-t-butyl-4-hydroxyphenyl)propionate]
Thio-bis-[ethylene 3-(3,5-di-t-butyl-4-hydroxyphenyl)propionate]
Stearamido N,N-bis-[ethylene 3-(3,5-di-t-butyl-4-hydroxyphenyl)propionate]
n-Butylimino N,N-bis-[ethylene 3-(3,5-di-t-butyl-4-hydroxyphenyl)propionate]
2-(2-stearoyloxyethylthio)ethyl 7-(3-methyl-5-t-butyl-4-hydroxyphenyl)heptanoate

Subclass C-3

1,2-propylene glycol bis-[3'-(3'',5''-di-t-butyl-4''-hydroxyphenyl)propionate]
Neopentylglycol bis-[3-(3',5'-di-t-butyl-4'-hydroxyphenyl)propionate]
Ethylene glycol bis-(3,5-di-t-butyl-4-hydroxyphenylacetate)
Glycerine-1-n-octadecanoate-2,3-bis-(3',5'-di-t-butyl-4'-hydroxyphenylacetate)
Tetrakis-[methylene 3-(3',5'-di-t-butyl-4'-hydroxyphenyl)propionate]methane
n-Propyl 1,1,1-tris-[methylene 3'-(3'',5''-di-t-butyl-4''-hydroxyphenyl)propionate]
Sorbitol hexa-[3-(3',5'-di-t-butyl-4'-hydroxyphenyl)propionate]
2-stearoyloxyethyl 7-(3'methyl-5'-t-butyl-4'-hydroxyphenyl)heptanoate The above phenolic ester stabilizers of subclasses C-1, C-2 and C-3 are more fully described in U.S. Pat. No. 3,330,859, Ser. No. 354,464, filed Mar. 24, 1964, now U.S. Pat. No. 3,411,575, and Ser. No. 359,460, filed Apr. 13, 1964, respectively.

CLASS D.—PHENOLIC HYDROCARBON STABILIZERS 4,4'-butylidene-bis(6-t-butyl-m-cresol)
4,4'-thio-bis-(6-t-butyl-m-cresol)
4,4'-methylene-bis-(2,6-di-t-butylphenol)
2,2'-methylene-bis[4-hydroxy-6-(1-methylcyclohexyl)phenol]
1,3,5-trimethyl-2,4,6-tris-(4-hydroxy-3,5-di-t-butylbenzyl)benzene
2,6-di-t-butylphenol
1,1,3-tris-(5-t-butyl-4-hydroxy-2-methylphenyl)-butane
4,4'-isopropylidene-bis-(2-t-butylphenol)

The above phenolic hydrocarbon stabilizers are known and many are commercially available.

In addition to one or more of the above phenolic stabilizers, it is often advantageous to employ other additives such as ultraviolet light absorbers, e.g., 2-hydroxy-4-methoxybenzophenone, 2 - (2' - hydroxy - 5' - methylphenyl)benztriazole, etc.; various phosphite compounds such as trioctylphosphite, dilaurylphosphite, tris(nonylphenyl)phosphite and the like. Such two, three or four component systems, when including a compound of the present invention, exhibit far superior properties to the additive properties of the individual components.

Other materials often added to such organic materials, depending upon the substrate, include pourpoint depressants, corrosion and rust inhibitors, metal deactivators, demulsifier, antifoam agents, carbon black, accelerators, plasticizers, color stabilizers, heat stabilizers, dyes, pigments and the like.

The above listed stabilizers may be used in the concentration of from about 0.005 to 10 percent by weight of the stabilized composition. A particularly advantageous range is from about 0.1% to 1% by weight.

The following examples will further illustrate the nature of the present invention without being a limitation thereof.

EXAMPLE I

Preparation of N,N',N''-tris(n-octylthiopropionyl) hexahydro-s-triazine

In a reaction vessel was placed 24.9 g. of 1,3,5-triacryloyl hexahydro-s-triazine, 46 g. of octylmercaptan (96.15% pure) and 300 ml. of dioxane. The reaction mixture was stirred under nitrogen and 0.2 g. of sodium methoxide was added. After the exothermic reaction subsided, the mixture was stirred for 45 minutes at 75° C. The reaction mixture was then cooled, filtered, and water was added to the filtrate to precipitate the product. The precipitated solid was filtered off, washed with water and air dried. The solid was then dissolved in hot methanol and cooled yielding 45 g. of the product having a melting point of 67–68.5° C. Thin layer chromatography gave no indication of any impurities. Elemental analysis gave the following results:

Theory: C—62.82; H—10.10; N—6.11; S—13.98
Actual: C—62.94; H—10.39; N—5.94; S—13.81–13.93

Similarly good results are obtained in preparing N,N',N'' - tris(n - octadecylthiopropionyl) - hexahydros - triazine, N,N',N'' - tris(n-methylthiopropionyl)-hexahydro - s - triazine, N,N',N''-tris(n-butylthiopropionyl)-hexahydro - s - triazine and N,N',N'''-tris(n-dodecylthiopropionyl) - hexahydro - s - triazine by reacting 1,3,5-triacryloyl hexanhydro-s-triazine respectively with n-octadecylmercapan, methylmercaptan, n-butylmercaptan and n-dodecylmercaptan. The reactions are carried respectively in dimethylformamide, tetrahydrofuran, diethyl ether and nitrobenzene in the presence of potassium hydroxide, sodium carbonate, n-butylamine and triethylammonium hydroxide respectively.

EXAMPLE II

Preparation of N,N',N''-tris[3-(isopropylthioethylthio) propionyl]-hexahydro-s-triazine Following the procedure described in Example I, 37.1 g. of isopropylthioethylmercaptan is added to a reaction vessel containing 24.9 g. of 1,3,5-triacryloyl-hexahydro-s-triazine in propanol. Potassium methoxide, 0.2 g., is used as the catalyst. The product, N,N',N''-tris[3-isopropylthioethylthio)propionyl]-hexahydro-s-triazine is obtained in good yield.

Similar results are obtained in preparing N,N',N''-tris-[3 - methylthioethylthio)propionyl]-hexahydro-s-triazine, N,N',N'' - tris[3 - (n-octylthioethylthio)propionyl]-hexahydro - s - triazine and N,N',N''-tris[3-(n-octadecylthioethylthio) propionyl] - hexahydro-s-triazine by reacting 1,3,5-triacryloyl hexahydro-s-triazine respectively with methylthioethylmercaptan, n-octylthioethylmercaptan, and n-octadecylthioethylmercaptan. The reactions are carried out respectively in dioxane, dimethylsulfoxide and tetrahydrofuran in the presence of lithium hydroxide, sodium isopropoxide and triethylene diamine respectively.

EXAMPLE III

Preparation of N,N',N''-tris[3-(carbo-n-octyloxyethylthio)propionyl]-hexahydro-s-triazine Using the procedure of Example I, 24.9 g. of 1,3,5-triacryloyl-hexahydro-s-triazine, 300 ml. of dimethylformamide and 69.8 g. of n-octyl 3-mercaptopropionate are placed in the reaction vessel. To this mixture is added 0.2 g. of sodium ethoxide. The product, N,N',N''-tris[3-(carbo - n - octyloxyethylthio)propionyl] - hexahydro-s-triazine is obtained in good yield.

Equally good results are obtained in preparing N,N',N'' - tris[3 - (carbomethoxyethylthio)propionyl]-hexahydro-s-triazine, N,N',N''-tris[3-(carbo-n-octadecyloxyethylthio)propionyl] - hexahydro-s-triazine and N,N',N''-tris[3 - (carbo - n-octyloxymethylthio)propionyl]-hexahydro-s-triazine by reacting 1,3,5-triacryloyl hexahydro-s-triazine respectively with methyl 3-mercaptopropionate, n-octadecyl 3-mercaptopropionate and n-octylmercaptoacetate. The reactions are carried out respectively in dioxane, ethanol and dimethylacetamide in the presence of potassium hydroxide, n-butylamine and tri-n-butylammonium hydroxide respectively.

EXAMPLE IV

Unstabilized polypropylene powder (Hercules Profax 6501) was thoroughly blended with 0.5% by weight on N,N',N'' - tris(3 - n - octylthiopropionyl)-hexahydro-s-triazine. The blended material was then milled on a two roller mill at 182°, for 10 minutes after which time the stabilized polypropylene was sheeted from the mill and allowed to cool.

The milled polypropylene sheet was then cut into pieces and pressed for 7 minutes on a hydraulic press at 218° and 2000 pounds per square inch pressure. The resultant sheet of 25 mil thickness was tested for resistance to accelerated aging in a forced draft oven at 150° C. As is shown below, polypropylene containing 0.5% by weight of the stabilizer of this invention was stabilized against oxidative deterioration.

|  | Hrs. |
|---|---|
| Polypropylene alone | 3 |
| Polypropylene containing N,N',N''-tris(3-n-octylthiopropionyl)-hexahydro-s-triazine | 195 |

EXAMPLE V

Unstabilized propylene was blended, as described above, with 0.5% by weight of N,N',N''-tris(3-n-octylthiopropionyl)-hexahydro-s-triazine and 0.1% by weight of dioctadecyl 3,5-di-t-butyl-4-hydroxybenzylphosphonate. The thus stabilized polypropylene, when tested as in Example IV, was found to be stable for 1500 hours.

When this example was repeated with only 0.1% by weight of dioctadecyl 3,5-di-t-butyl-4-hydroxybenzylphosphonate, but without the triazine compound, polypropylene was found to be stable for only 40 hours.

Similar results are obtained when in this example N,N',-N'' - tris(3-n-dodecylthiopropionyl)-hexahydro-s-triazine is employed in place of the above noted triazine compound.

EXAMPLE VI

Unstabilized polypropylene was blended, as described above, with 0.5% by weight of N,N',N''-tris(3-n-octylthiopropionyl)-hexahydro-s-triazine and 0.1% by weight of 2,4-bis-(3,5-di-t-butyl-4 - hydroxyphenoxy)-6-(n-octylthio)-1,3,5-triazine. The thus stabilized polypropylene, when tested as in Example II, was found to be stable for 1970 hours.

When this example was repeated with only 0.1% by weight of 2,4-bis-(3,5-di-t-butyl-4-hydroxyphenoxy)-6-(n-octylthio)-1,3,5-triazine, but without the triazine compound, polypropylene was found to be stable for 120 hours.

Similarly good results are obtained when in this example the following combination of antioxidants are employed:

(a) 6-(4-hydroxy-3-methyl-5-t-butylanilino-2,4-bis-(n-octylthio)-1,3,5-triazine and N,N',N''-tris(n-decylthiopropionyl)-hexahydro-s-triazine
(b) 2,4-bis(n-octylthio)-6-(3,5-di-t-butyl-4-hydroxyanilino)-1,3,5-triazine and N, N', N''- tris(n-dodecylthiopropionyl)-hexahydro-s-triazine
(c) n-Octadecyl 3-(3,5-di-t-butyl-4-hydroxyphenyl)-propionate and N,N',N''-tris(n-hexylthiopropionyl)-hexahydro-s-triazine
(d) Di-n-octadecyl 3,5-di-t-butyl-4-hydroxybenzylphosphonate and N,N',N''-tris-(n-octylthiopropionyl)-hexahydro-s-triazine·
(e) 2,4-bis(4-hydroxy-3,5-di-t-butylphenoxy)-6-(n-octylthioethylthio)-1,3,5-triazine and N,N',N''- tris(isopropylthiopropionyl)-hexahydro-s-triazine
(f) Tetra-[3-(3,5-di-t-butyl-4-hydroxyphenyl)propionyloxymethyl]methane and N,N',N''-tris(n-octylthiopropionyl)-hexahydro-s-triazine
(g) 1,1,1-tris-[3-(3,5-di-t-butyl-4-hydroxyphenyl)-propionyloxymethyl)-propane and N,N',N''-tris(n-hexadecylthiopropionyl)-hexahydro-s-triazine
(h) Di-n-octadecyl 1-(3,5-di-t-butyl-4-hydroxyphenyl)-ethanephosphonate and N,N',N''-tris(ethylthiopropionyl)-hexahydro-s-triazine
(i) 1,2-propylene glycol bis-[3'-(3'',5''-di-t-butyl-4''-hydroxyphenyl)propionate and N,N',N''-tris[3-(octylthioethylthio)propionyl]-hexahydro-s-triazine
(j) 4,4'-butylidene-bis(6-t-butyl-m-cresol) and N,N',N''-tris[3-carbo-n-octadecyloxyethylthio) propionyl] hexahydro-s-triazine.

EXAMPLE VII

A stabilized mineral oil composition is prepared by incorporating into a refined mineral oil of 183 S.U.S. at 100° F. (Regal Oil B, Texas Company) 0.005% by weight N,N'N''-tris(n-octyldecylthiopropionyl) - hexahydro-s-triazine. Even better stabilization is obtained when in combination with said triazine compounds used 6-(4-hydroxy - 3,5 - di-t-butylanilino)-2,4-bis(phenoxy)-1,3,5-triazine.

EXAMPLE VIII

Stabilized lard is prepared by incorporating in lard 0.01% by weight of N,N',N''-tris(n-dodecylthiopropionyl)-hexahydro-s-triazine.

Stabilized cotton seed oil is prepared when 0.01% by weight of this stabilizer is incorporated in a refined cotton seed oil.

EXAMPLE IX

Stabilized gasoline is prepared by incorporating into gasoline having no additives and no stabilizers therein, 0.05% by weight of N,N',N''-tris(n-decylthiopropionyl)-hexahydro-s-triazine. Stabilization is further improved by the addition of 0.02% by weight of 2,4-bis-(4-hydroxy-3,5-di-t-butylphenoxy)-6-(n-dodecylthioethylthio) - 1,3,5-triazine.

EXAMPLE X

Paraffin wax (M.P. 125–128° F.) is stabilized by incorporating therein 0.001% by weight of N,N',N''-tris [3-(octadecylthioethylthio)propionyl] - hexahydro-s-triazine. An improved stabilization is obtained when additionally 0.005% by weight of di-n-tetradecyl 3,5-di-t-butyl-4-hydroxybenzyl-phosphonate is added.

EXAMPLE XI

A stabilized high temperature lubrication oil is prepared by incorporating 2% by weight of N,N',N''-tris(n-butylthiopropionyl)-hexahydro-s-triazine into lubricant, which comprises diisoamyladipate. The stabilization of said lubricant is further improved by the addition of diethylene glycol bis-[3-(3',5'-di-t-butyl - 4' - hydroxyphenyl)propionate].

EXAMPLE XII

High impact polystyrene resin containing elastomer (i.e., butadiene-styrene) is stabilized against loss of elongation properties by incorporation of 0.5% by weight of N,N',N''-tris[3-(carbo - n - octyloxyethylthio)propionyl]-hexahydro-s-triazine and 1.0% by weight of tetrakis-[methylene - 3 - (3',5'-di-t-butyl-4'-hydroxyphenyl)propionate]methane.

Similar results are obtained with a terpolymer of acrylonitrile-butadiene-styrene.

EXAMPLE XIII

A polyethylene composition is prepared by adding to polyethylene 0.2% by weight of carbon black, 0.3% by weight of N,N',N''-tris(n-octylthiopropionyl)-hexahydro-s-triazine and 0.1% by weight of dioctadecyl 3,5-di-t-butyl-4-hydroxybenzylphosphonate. The thus stabilized polyethylene exhibits much more stability than polyethylene containing only carbon black or carbon black with said phenolic stabilizer.

What is claimed is:
1. A compound having the formula:

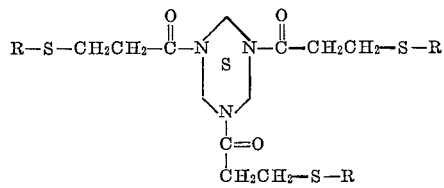

wherein R is

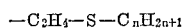

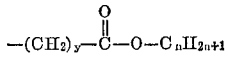

wherein $n$ is an integer from 1 to 18 and $y$ is 1 or 2.
2. A compound according to claim 1 wherein R is —$C_nH_{2n+1}$.
3. A compound according to claim 1 wherein R is —$C_2H_4$—S—$C_nH_{2n+1}$.

4. A compound according to claim 1 wherein R is
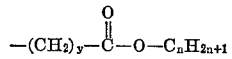
5. A compound according to claim 1 wheerin R is 3-n-octyl group.
6. A compound according to claim 1 wherein R is 3-n-dodecyl group.
References Cited
UNITED STATES PATENTS
3,449,340  6/1969  Orth et al. _____ 260—248
HENRY R. JILES, Primary Examiner
J. M. FORD, Assistant Examiner
U.S. Cl. X.R.
99—163; 252—401; 260—45.8